UNITED STATES PATENT OFFICE.

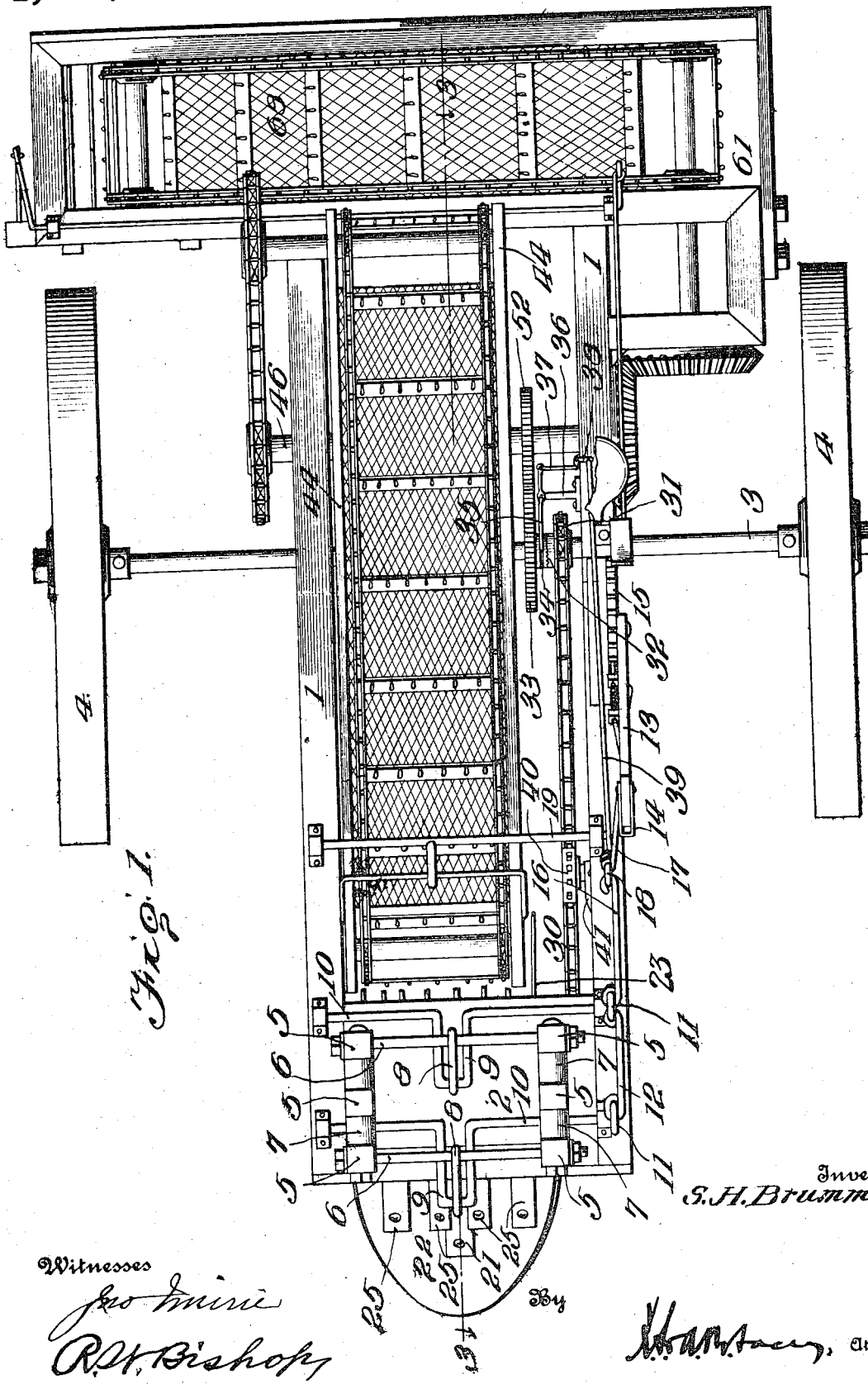

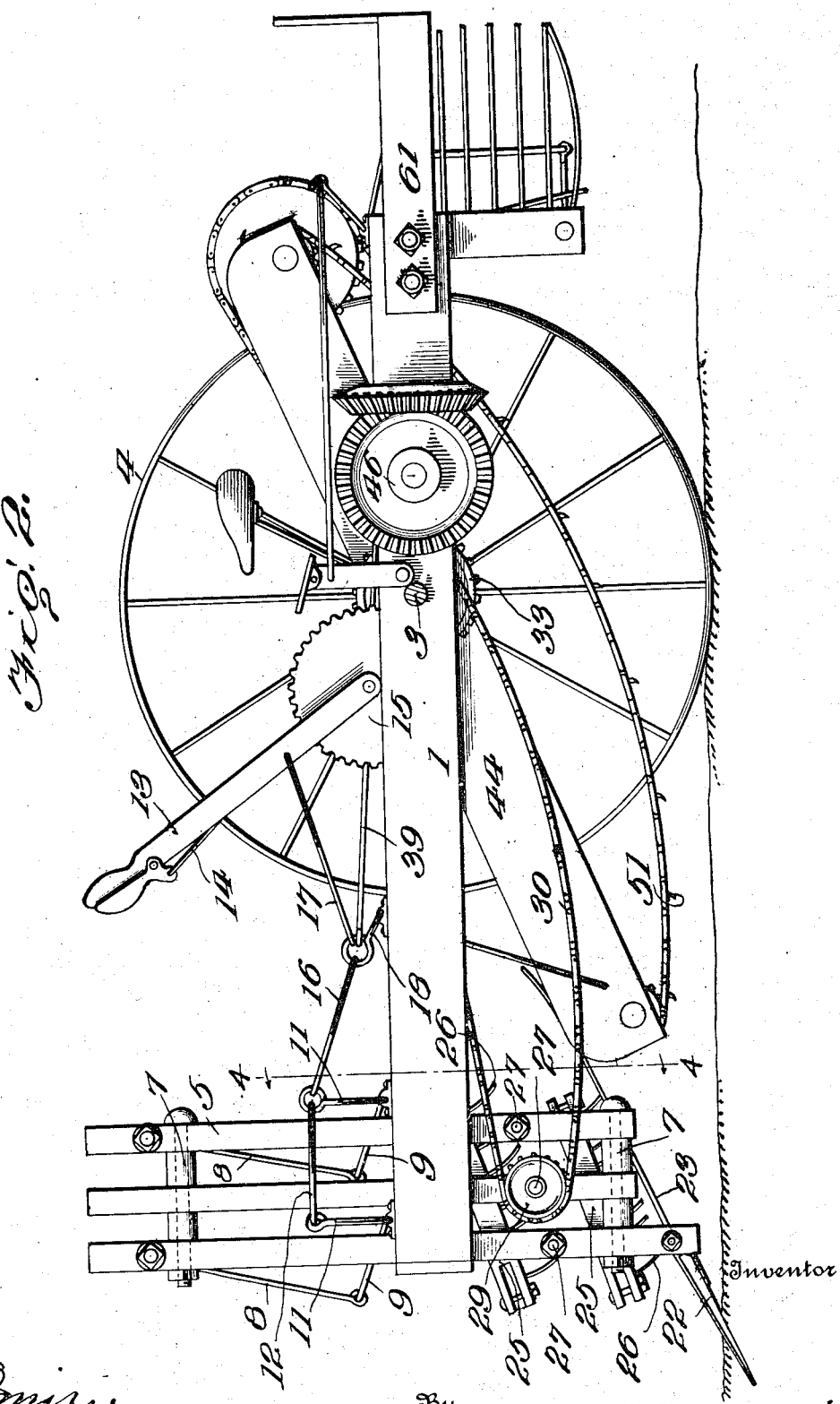

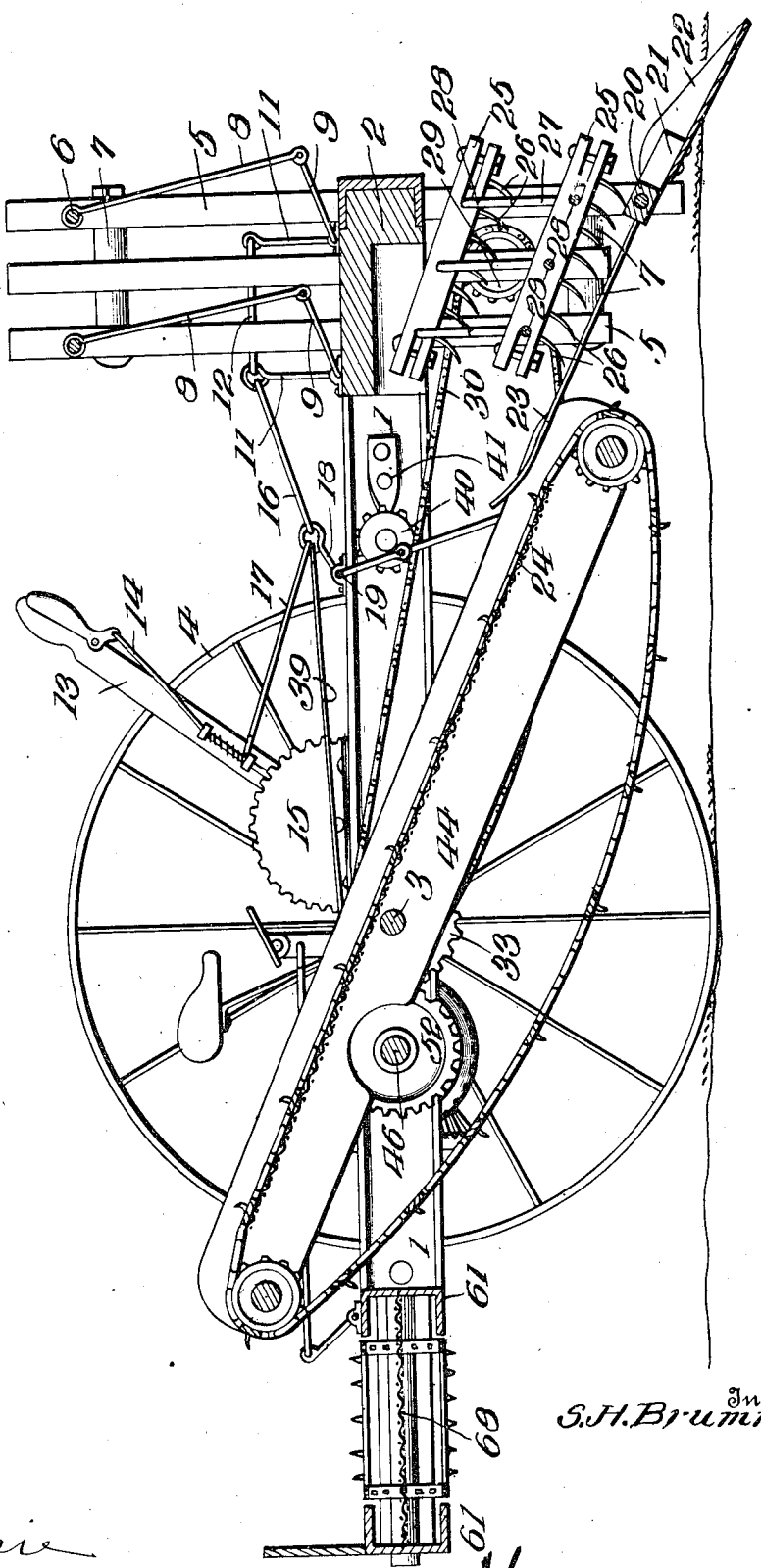

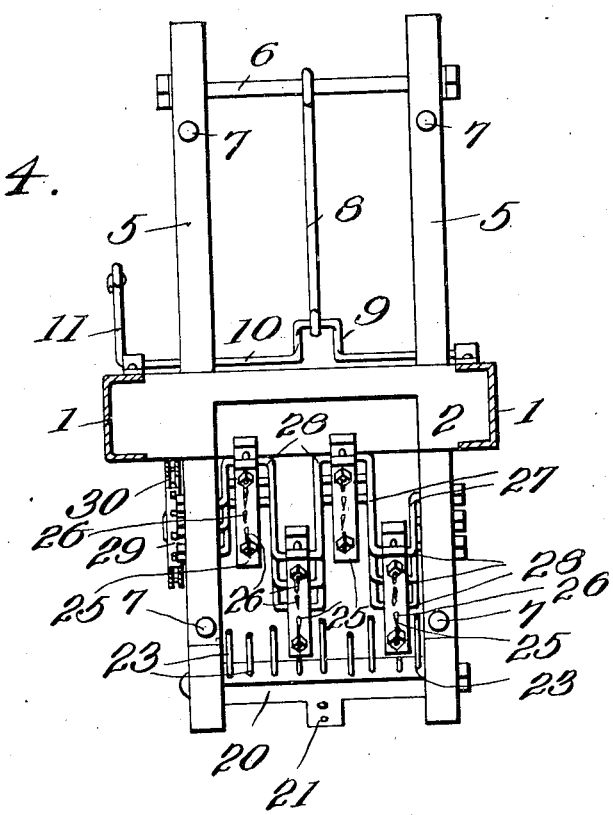

SINCLAIR H. BRUMMETT, OF SCRANTON, TEXAS.

PEANUT-HARVESTER.

1,140,569.   Specification of Letters Patent.   Patented May 25, 1915.

Application filed May 12, 1914. Serial No. 838,127.

*To all whom it may concern:*

Be it known that I, SINCLAIR H. BRUMMETT, citizen of the United States, residing at Scranton, in the county of Eastland and State of Texas, have invented certain new and useful Improvements in Peanut-Harvesters, of which the following is a specification.

This invention relates to peanut harvesters which uproot the peanut vines and deliver them to a suitable receptable, and free them from all sand and dirt in their passage from the uprooting mechanism to the receptacle.
One object of the invention is to provide means for positively feeding the vines from the uprooting mechanism to the conveyer and cleaning device, and a still further object of the invention is to provide means whereby the uprooting mechanism or plow may be set to run at any desired depth of the soil.

The invention also seeks to improve generally the construction and arrangement of the several parts of a peanut harvesting machine to the end that the efficiency and durability of the same may be increased.

The several objects of the invention are attained in such a machine as is illustrated in the accompanying drawings, and the invention consists in certain novel features which will be hereinafter first fully described and then more particularly pointed out in the claims following the description.
In the drawings, Figure 1 is a plan view of a machine embodying my present improvements; Fig. 2 is a side elevation of the same; Fig. 3 is a longitudinal vertical section thereof; Fig. 4 is a transverse section on the line 4—4 of Fig. 2.

In carrying out my invention I employ a main frame consisting of side bars 1, the front ends of which are connected by a platform 2 to which a suitable draft device may be connected in any convenient or preferred manner. An axle or driving shaft 3 is suitably journaled in the side bars, and traction wheels 4 are secured to the ends of said axle, as will be readily understood. Slidably mounted in the platform 2, at the sides of the same, are vertical posts or standards 5 which are connected by suitable transverse bars or bolts 6, and also by longitudinally disposed bars or bolts 7. The uprooting mechanism or plow is carried by the lower ends of these standards, which constitute a strong support for the said mechanism, and the standards are supported at any desired height by means of links 8 which are pivoted at their upper ends upon the cross bars or bolts 6 and at their lower ends to the crank arms 9 provided centrally upon rockshafts 10 which are suitably journaled upon the main frame. Two of the said rock-shafts are illustrated in the accompanying drawings arranged respectively adjacent the front and rear of the frame provided by the said standards 5 and at one side, preferably the left hand side of the machine, these rock-shafts are equipped with crank arms 11 connected by a link 12. The link 12 insures simultaneous movement of the rock-shafts in the same direction, and the rear crank arm 11 is connected through suitable links with a lever 13 fulcrumed upon the main frame and equipped with a latch device 14 adapted to engage a segment 15 upon the main frame whereby the rockshafts may be held in any set position and the vertical adjustment of the standards 5 maintained. In the present instance, the connection between the rear crank arm 11 and the lever 13 consists of links 16 and 17, and the link 16 being attached to the crank arm 11 and to an intermediate crank arm 18, while the link 17 is connected to the said crank arm 18 and to the lever, as shown. The crank arm 18 is formed on one end of a rock-shaft 19 which is connected with the main conveyer frame to raise and lower the same simultaneously with the standards.

Upon reference to Figs. 2 and 3 of the drawings it will be noted that the foremost standards 5 are elongated below the other standards. To the said elongated lower end I secure a cross-bar 20 having a forwardly projecting central tongue 21 to which the plow or shovel 22 is secured. The tongue 21 is inclined downwardly and forwardly so that the shovel or plow which is carried by the same will enter the ground at a proper inclination to uproot the vines and force them from the ground as the machine moves forward. From the rear side of the cross-bar 20 a series of rods or fingers 23 extend upwardly and rearwardly so as to support the vines in their passage from the plow to the conveyer 24, the rear ends of the said rods or fingers extending over the forward extremity of the conveyer, as clearly shown. These rods may be of any desired number and are spaced apart so that the large lumps of dirt which may be taken up with the vines may readily fall to the ground in rear of the plow.

Immediately above the rods or fingers 23 I provide a gang of feeders which consist of longitudinally disposed heads or bars 25, and teeth 26 depending from the said bars. The heads or bars are carried by a series of transverse rock-shafts 27 which are provided with crank portions 28 which pass through the said heads or bars so as to support the same. One of the said shafts is equipped at its end with a sprocket wheel 29 around which is trained a sprocket chain 30 whereby motion is imparted to the said sprocket wheel, and it will be readily understood that when the said shafts are rotated the feeders will be caused to move back and forth over the rods or fingers 23 so that the teeth 26 will take into the vines and force them upwardly along the said rods. The shafts rotate in such direction that when the feeders are moved rearwardly they will be close to the said rods or fingers, but when they move forwardly they will be above the said rods and, consequently, will not engage the vines until they again descend and start to move rearwardly. Any number of these feeders may be employed, according to the capacity of the machine, and they should be of such a number that all the vines taken up by the plow will be engaged and positively fed over the rear ends of the fingers or rods 23. The sprocket chain 30 is trained around a sprocket wheel 31 which is loosely mounted upon the axle or driving shaft 3 and is provided with a clutch hub on its inner side, indicated at 32. A master gear 33 is slidably mounted upon the axle and constrained to rotate therewith, and this master gear is equipped with a clutch hub 34 which is adapted to engage the clutch hub 32 so that the rotation of the axle will be imparted to the sprocket wheel 31 and thence through the chain 30 and the sprocket 29 to the feeders. The clutch hub 34 is engaged by a lever 35 which is fulcrumed upon a standard 36 projecting inwardly from one side of the main frame, and the rear end of this lever 35 is connected by a link 37 with one arm of an angle lever 38 which is fulcrumed upon the main frame. A link 39 connects the said angle lever with the crank arm 18 so that when the lever 13 is manipulated to raise the plow from the ground the master gear 33 will be moved away from the sprocket 31 and, consequently, the clutch members disengaged, whereupon the operation of the feeders will cease. It will be readily noted that when the lever 13 is swung rearwardly the links 17 and 16 will be drawn upon so as to swing the crank arms 11 rearwardly and thereby move the crank arms 9 upwardly so that the links 8 will rise and the standards 5 be lifted, consequently withdrawing the plow from the ground. The upward vertical movement of the plow carrying standards will tend to slacken the sprocket chain 30 which may then be disengaged from the sprockets 29 and 31, and to prevent such disengagement I provide an idler 40 which engages the upper run of the said sprocket chain and is preferably carried by a resilient bracket 41 so that the chain will remain taut under all conditions.

The main conveyer frame 44 is pivotally hung upon the axle 3 and is suspended at its front end from the rock shaft 19 so that, when the lever 13 is swung forwardly or rearwardly to lower or raise the plow-carrying frame, the shaft 19 will be simultaneously rocked to lower or raise the front end of the conveyer. The frame 44 is properly constructed to clear a counter-shaft 46, and the conveyer is actuated by a suitable train of gearing driven by said counter-shaft.

The counter-shaft 46 is journaled in the side bars of the main frame and is equipped with a gear wheel 52 which meshes with the master gear 33 in the operation of the machine. It will be readily noted that when the said master gear is shifted laterally to disengage it from the sprocket 31 it will be simultaneously moved out of mesh with the gear 52 so that the operation of all the moving parts will cease and, consequently, the machine may be drawn along a road or from one field to another without any wear upon the mechanism. The counter-shaft 46 is also connected through suitable gearing with a conveyer in a transverse conveyer frame 61 at the rear end of the main frame, as clearly shown in Fig. 1. The transverse conveyer will carry the vines to one side of the machine and may deliver them to a receptacle supported on the frame.

In use, my improved machine is drawn over the field along the row of vines to be harvested, and the lever 13 is swung forwardly so that the master gear will be in engagement with the sprocket 31 and the gear 52, while the plow will be set to run at the proper depth below the surface of the ground. The rotation of the axle or driving shaft 3 will then be transmitted directly to the shaft 46 and the sprocket 29 so that the feeders will be set in motion and the conveyers caused to travel. As the machine progresses the vines will be uprooted and will be fed over the separator rods or fingers 23 onto the main conveyer 24 and by the said conveyer will be carried up to and over and deposited upon the rear transverse conveyer which will deliver the vines upon the ground or into the receptacle on the frame. As the vines pass over the rods or fingers 23 the large lumps of dirt will fall through to the ground while any sand which may tend to cling to the vines will be shaken from them in their passage over the conveyers through the agitation imparted to the vines by the vibration of the machine as it travels over the irregularities in the surface of the ground.

It will be readily noted that in my machine the several parts are compactly arranged and are simple in construction so that they are not liable to get out of order, and repairs will be seldom needed. The several working parts are driven directly and positively and the vines will be fed continuously to the rear of the machine. The plow may, obviously, be set to run at any desired depth and the master gear and the clutch members may be made of such dimensions that the shifting of the gear simultaneously with the adjustment of the plow carrying frame will not disengage the gear members until the plow has been lifted entirely clear of the ground.

Having thus described my invention, what I claim as new is:

1. The combination of a main frame, standards mounted in the main frame and extending above and below the same, a plow carried by the lower ends of the standards, feeders carried by the standards below the main frame, and means on the main frame connected with the upper ends of the standards to move the same vertically.

2. In a peanut harvesting machine, the combination of a main frame, a plow supporting frame mounted upon and depending from the front end of the main frame, a plow carried by the lower end of the plow supporting frame and projecting forwardly therefrom, feeders counted upon the said frame above and in rear of the plow, and means for operating the said feeders from the main frame.

3. In a peanut harvesting machine, the combination of a main frame, a driving shaft thereon, a vertically-slidable plow carrying frame at the front end of the main frame, a plow carried by and projecting forwardly from the lower end of the plow-carrying frame, a feeder mounted in the said frame above and in rear of the plow means for moving the plow-carrying frame vertically, and operative connections between the said feeder and the driving shaft.

4. The combination of a main frame, a vertical frame mounted in the front end of the main frame, a plurality of transverse crank shafts mounted in the vertical frame below the main frame, a series of longitudinally extending feeders mounted on the cranks of the said shafts, means for rotating the said shafts, a plow secured to and projecting forwardly from the lower end of the vertical frame at the front side of the same, and fingers projecting rearwardly from the plow in proximity to the path followed by the feeders in the lower portions of their movement.

5. The combination of a main frame, a series of standards mounted in the front end of the main frame, transverse and longitudinal connections between the said standards, the forward standards being extended below the rear standards, a plurality of crank shafts mounted in the standards below the main frame and disposed transversely with respect to the main frame, a series of feeders mounted upon the cranks of said shafts, means for rotating the said shafts, a plow carried by the lower ends of the forward standards and projecting forwardly beyond the same, and fingers projecting rearwardly from the plow beyond the rear standards.

6. The combination of a main frame, standards mounted in the front end of the main frame at the side thereof, a bar secured to and extending between the lower ends of the forward standards, a plow secured to said bar and projecting forwardly therefrom, a series of fingers secured to and projecting rearwardly from said bar, a series of longitudinally movable feeders mounted between the standards, and means for operating said feeders.

7. The combination of a main frame having a platform at its front end, a series of standards slidably mounted in said platform, connections between said standards whereby to brace and space the same, a plow secured to and projecting forwardly from the lower ends of the forward standards, a series of fingers projecting rearwardly from the plow between the standards and beyond the rear standards, a plurality of transverse crank shafts mounted in and extending between the standards below the platform, longitudinally extending feeders mounted upon the cranks of said shafts, and means for rotating said crank shafts.

In testimony whereof I affix my signature in presence of two witnesses.

SINCLAIR H. BRUMMETT.

Witnesses:
R. M. BRUMMETT,
C. H. JOBE.